June 23, 1925.
F. J. J. STOCK
1,543,301
METHOD OF REGENERATING WORN CINEMATOGRAPHIC FILMS
Filed April 24, 1923   2 Sheets-Sheet 2
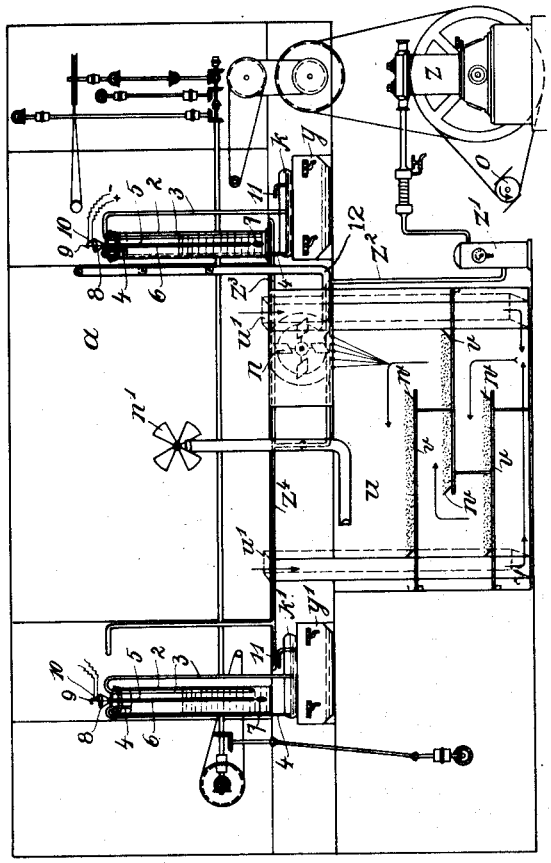
Friedrich Johann Jacob Stock
INVENTOR;
By
his Attorney.

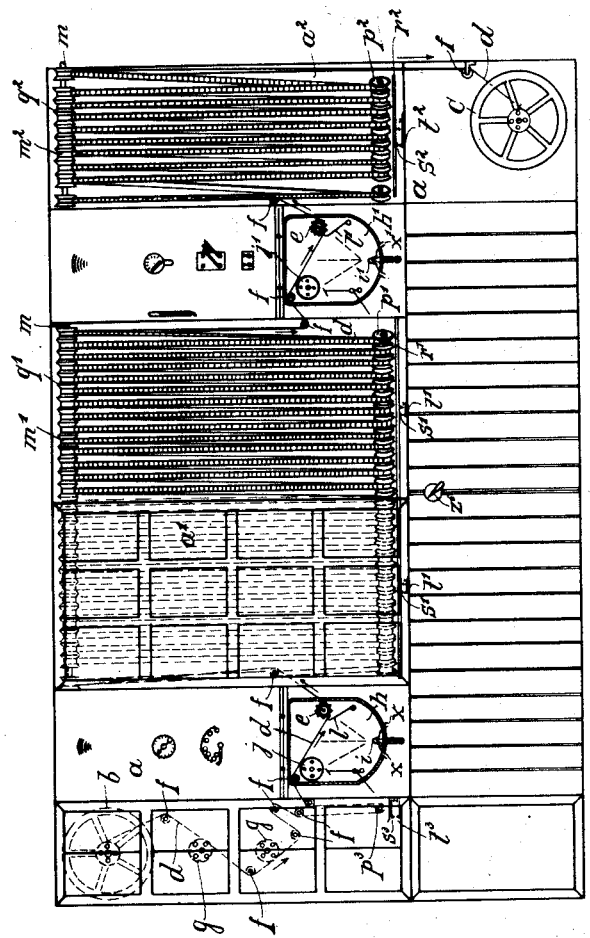

Patented June 23, 1925.

1,543,301

UNITED STATES PATENT OFFICE.

FRIEDRICH JOHANN JACOB STOCK, OF MUNICH, GERMANY.

METHOD OF REGENERATING WORN CINEMATOGRAPHIC FILMS.

Application filed April 24, 1923. Serial No. 634,249.

*To all whom it may concern:*

Be it known that I, FRIEDRICH JOHANN JACOB STOCK, citizen of Germany, residing at Munich, Bavaria, Germany, have invented certain new and useful Improvements in Methods of Regenerating Worn Cinematographic Films; and I do hereby declare the following to be a full, clear, and exact description of the invention, such as will enable others skilled in the art to which it appertains, to make and use the same.

My invention relates to a method of regenerating worn or aged film bands, or the negatives from which the cinematographic films are reproduced. Its main object is to thoroughly regenerate such films and reimpart to them their original clear and flexible properties, removing all scratches and brittleness, thus preventing premature waste and materially lengthen the life of the films.

Another object of the invention is to regenerate the films so that their display, after treatment, will be free from all noxious spots and streaks known as the "raining effect" which, apart from spoiling the picture, is both tiresome and injurious to the eye.

A further object of the invention is the replacement of the hitherto used superficial treatment which does not permit of a proper and lasting restoration, by a treatment intrinsically affecting and regenerating the body material of the film itself, as also the emulsion layer.

With these and other objects in view my invention consists in subjecting the film to the action of various solving agents which penetrate into the material, swelling and superficially liquefying it, and to thereafter drying and hardening it as by the application of moving air.

Apart from this method of treatment my invention also consists in the provision of suitable and efficient means for carrying out the said method.

The following is an example of the manner in which I intend carrying out my improved method of regenerating cinematographic films. The various solvents and other chemicals named are also understood as being given by way of example only.

First of all, the film is properly cleaned and then its face i. e. the emulsion side, is subjected to the action of a suitable solving or swelling agent, preferably by spraying. For this purpose water of about 60 to 70° C. and acidulated with acetic or citric acid may be used, to which some tanning agent, such as chrome alum may be added to prevent the pictures becoming indistinct. After the emulsion layer of the film has been swelled in this way it is exposed to a current of hot air, or steam, which increases the action of the solvent on the surface. The surface of the emulsion layer is, hereby, liquefied to a certain degree, and in order not to impair the clearness of the photographs, the time during which the hot air, or steam, is allowed to act on the film, as well as the temperature, will have to be carefully regulated. Immediately after its treatment by the hot air or steam the film is subjected to a draught of air which is first passed through a quantity of calcium chloride, or a similar hygroscopic substance, to remove any moisture which it may contain, so that the film dries quickly as the air strikes it.

Then the back of the film is treated likewise by subjecting it to the action of a volatile solvent for celluloid or the like, such as acetone, acetic acid ester, methyl alcohol and the like, so that the body material of the film swells up and becomes absorbent. To ensure the original elasticity being restored after regeneration, certain substances of a higher boiling point are added to the just named solvents, such for instance as phthalic acid diethyl ester; such substances serving as camphor substitutes and remaining in the body of the film thus restoring and retaining its original elasticity. In order to avoid undue surface tension the film may be exposed for some time to the vapours which are formed during the process. This step of delaying the setting or hardening action at the back of the film represents a contradictory measure to the treatment of the emulsion side, where a quicker setting is aimed at; the purpose of the retardation is to enable the chemicals to penetrate right into the material.

In order that the solvents may uniformly adhere to the film especially at such places which may have come into contact with oil or other greasy substances, one or more binding media, such as gelatine, isinglass or the like may be added in small quantities to the solvents. By this expedient the solvents are held uniformly upon the film and are thus able to effectively perform their function under the action of the hot air or steam, for the back of the film filling agents such as nitrocellulose celluloid or similar substances may be added to the solvent.

The preferred form of apparatus for carrying out the method above described is illustrated in the accompanying drawing in which Fig. 1 is a front elevational view with certain of the doors removed to show interior construction, and Fig. 2 is a rear elevational view.

Arranged within the casing or housing $a$ is a drum $b$ to receive the worn film $d$ and $c$ is a drum upon which the restored film is wound. The film is unwound from the drum $b$ through the intermediary of the motor $o$, feed rolls $e$ and guide rolls $f$ and moves in the direction of the arrows to be wound on to the drum $c$.

Upon leaving the drum $b$ the film is first passed over two cylindrical brushes $g$ and freed from any particles of dust or other foreign matter adhering thereto. Thence the film is fed into the atomizing chamber $h$ in which the emulsion side of the film is subjected to the direct and indirect action of the nozzles $i$ for the solvent. The action of the atomizer is preferably adjustable and the solvent is supplied thereto from the tank $k$. The solvent is sprayed in finely comminuted uniform condition partly onto a rapidly rotating applying roll $j$ which applies the solvent to the film, and partly directly onto the film. In order that a greater or less quantity of solvent may be directed onto the roll $j$ or onto the film, as desired, the nozzle $i$ is rotatable and angularly adjustable, within the chamber $h$. The excess of solvent passes out of the chamber $h$ through tubes $x$ into a container $y$ to be reused.

The film passes from the chamber $h$ into the casing section $a'$ wherein it is subjected first to the action of a current of hot air or steam caused by the motor driven fan $n$ and subsequently to a drying current of air which will be referred to more particularly at a later stage. The film then passes into a second atomizing chamber $h'$, in which the rear or reverse side of the film is treated with the solvent. The solvent issues through the adjustable nozzle $i'$, which is fed from the tank $k'$. The solvent applying roll in the chamber $h'$, is designated $j'$, $l'$ is a guard or protector shielding the feed roller $e$ against the solving medium, while $x'$ denote pipes through which excess solvent flows to the container $y'$ after its passage through the chamber $h'$. the film is led into section $a^2$ where it is subjected to the action of the vapours arising from the solvent, so that drying and hardening the bank of the film is delayed until the solvent has had sufficient time to penetrate right into the material. In the upper parts of the divisions $a'$ and $a^2$ toothed drums $m'$ and $m^2$ are mounted in spaced relation upon the shaft $m$. The film passing over these drums or rollers forms depending loops in the lower bights of which comparatively heavy rolls $p'$ and $p^2$ are placed. As the shaft $m$ rotates the several loops of the film are advanced each independently of the others after the manner of a worm conveyer, and the face of the film under treatment is always directed outwardly being thus subjected to the action of the air or steam current. Although the advance of the film is positive it is not rigid because the rollers $p^1$, $p^2$, hang free and are not in fixed bearings. Any irregularities in the feed of the film will therefore simply cause an unevenness in the length of the loops which does not in any way affect the action of the apparatus.

Inasmuch as the film does not reach the toothed drum $m^1$, $m^2$, in an exactly vertical direction it might occur that certain parts of the film, e. g. parts that are joined, may not properly engage the drum and to prevent this guide discs $q^1$, $q^2$, are arranged between the toothed drums $m^1$, $m^2$.

Arranged adjacent the floor of the housing $a$ are vertically movable contact plates $r'$, $r^2$, $r$, (boards or the like) carrying the contacts $s'$, $s^2$, $s^3$, these plates being normally pressed yieldingly upward. If one of the loops of the film tears or becomes too long the weight or roller $p^1$, $p^2$, therein impacts against the plate $r'$, $r^2$ or $r^3$, etc., causing its contacts $s'$, $s^2$ or $s^3$ to engage with the contact $t'$, $t^2$ or $t^3$ thus closing a circuit to actuate an audible or visual signal (not shown) and by means of suitable well known mechanism, which it is thought unnecessary to illustrate, stop the motor cut out the heating device and interrupt the flow of solvent.

The air current is preferably heated by being passed over electric heating bodies arranged in the blast pipe of the fan. The current is preferably caused to flow in a circuit, by means of the fans, so as to use its heat for the drying action as far as possible, and the moisture which the air takes up in the sections $a'$ and $a^2$, is given off to a hygroscopic body arranged in the path of the air current. As shown in Fig. 2 there is provided at the rear of the apparatus a chamber $u$ containing calcium chloride over which the air entering the chamber through the pipes $u'$ flows in the direction of the arrow and gives off the moisture to the calcium chloride. The dehydrated air is drawn by fans $n$ and $n'$, out of the chamber $u$ through suitable pipes or openings, passes over the electrical heating bodies by fan $n$ and is blown into the casing $a$ through the pipe 12 passing thence through the tubes $u'$, back into chamber $u$.

$z$ is the compressor for compressing the air used for atomizing purposes and $z'$ is the air chest from which the compressed air is conducted through the pipes $z^2$, $z^3$, $z^4$ to the nozzles. Branches lead to the manometer. $z^5$ Fig. 1 is the means for closing the compressed air conduit.

In order that the level of the solution in the containers, $k$, $k'$, may be maintained uniform I preferably provide feeding means having an automatic intermittently operating siphon as illustrated in Fig. 2. The solvent container is denoted 2 and is provided at its upper end with a tight cork closure into which the tubes 3 and 4 pass. The tube 3 is bent intermediate its ends, one branch extending nearly to the bottom of the container 2 and the other branch extending nearly to the bottom of the solvent containers $k$, $k'$. The second tube 4 is also bent intermediate its ends, one branch terminating immediately below the cork closure in the container 2 the other branch being so deeply immersed in the container $k$, $k'$, that its opening is sealed by the liquid. A third tube, 5, extending into the container 2 serves for filling the latter. Operable in the container 2 is a float 7 (on a rod 6) which closes the bottom of the tube 5 when the container 2 is full. The rod 6 extends above the filling funnel 8 of the tubes 5 and is provided at its upper end with a finger 9 which, when the float descends, closes the contacts 10 of an electric circuit containing a visual or audible signal (not shown) which is operated upon the closing of the circuit.

Container 2 is completely filled with the liquid and if suction is applied by any suitable means, to the tubes 3 the latter act as a siphon. Fluid will pass through the tubes 3 out of container 2 into the containers $k$, $k'$, until the liquid level in the latter seals the lower ends of tubes 4. The result of this is rarefication of the air in the space above the liquid level in container 2 and the cessation of flow through the siphon tube 3 into the containers $k$, $k'$. If the atomizing means be set into operation by opening the member, $z^5$, the fluid is drawn or sucked from the atomizers, $i$, $i'$, through the tubes 11 out of the containers $k$, $k'$, and the liquid level in the latter drops. At the moment that the liquid level drops below the lower end of the tubes 4 air may flow thereinto which will pass to the container 2 thus causing the passage of fluid from container 2 to containers $k$, $k'$, this action continuing until the fluid again seals the lower ends of the tubes 4 and thus stopping the admission of air to container 2. In this manner the liquid level in $k$, $k'$ is maintained substantially constant.

If the container 2 be emptied to the extent that float 7 drops, the finger 9 closes the contacts 10 giving the signal which indicates that container 2 requires replenishment.

The mechanism for transmitting the movement of motor $o$ to the several movable parts of the device is clearly shown in Fig. 2 and is thought not to require description in detail.

What I claim is:—

1. The method of regenerating worn or aged films which consists in applying a solvent to the damaged side of the film band adapted to penetrate and swell the material, superficially liquefying the swelled material by the action of hot fluid, and finally drying and thereby rehardening the film.

2. The method of regenerating worn or aged cinematographic films, which consists in consecutively spraying a volatile solvent to the emulsion side of the film, subjecting the film to currents of hot air and steam spraying a solvent to the back of the film, subjecting the film to the vapours arising during the process, and finally drying and thereby rehardening the film.

3. In the method of regenerating worn or aged films as claimed in claim 2 the additional step of adding a tanning medium to the solving agent for the emulsion side.

4. In the hereindescribed method of regenerating worn or aged film bands by swelling the emulsion side and the back of the film, superficially liquefying the surfaces and finally rehardening same, the addition to the solvent for the body material of the film of substances of high boiling point to serve as camphor substitutes.

5. In the hereindescribed method of regenerating worn or aged films by swelling the emulsion side and the back of the film, superficially liquefying the surfaces and finally rehardening same, the addition to the solvent for the body material of the film of phthalic acid ester to serve as a camphor substitute.

6. The method of regenerating worn or aged films which consists in regenerating the emulsion side of the film, subjecting the back of the film to a volatile solvent adapted to swell the body material of the film and make it absorbent, delaying the rehardening of said back by exposing it to the vapors of the process to enable the solvent to penetrate into the material and then rehardening said back.

7. In the method of regenerating worn or aged films as claimed in claim 6, the additional step of adding binding media to said solvent.

In testimony whereof I hereunto affix my signature in the presence of two witnesses.

FRIEDRICH JOHANN JACOB STOCK.

Witnesses:
 HERMAN MARTIN,
 CARL ZEIGLER.